(12) United States Patent
Hatano et al.

(10) Patent No.: US 6,721,099 B2
(45) Date of Patent: Apr. 13, 2004

(54) VARIABLE DISPERSION COMPENSATOR

(75) Inventors: Tatsuya Hatano, Tokyo (JP); Daeyoul Yoon, Tokyo (JP); Hiroshi Matsuura, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 167 days.

(21) Appl. No.: 09/997,651

(22) Filed: Nov. 29, 2001

(65) Prior Publication Data
US 2003/0035216 A1 Feb. 20, 2003

(30) Foreign Application Priority Data
Aug. 16, 2001 (JP) .......................... 2001-247313

(51) Int. Cl.[7] .............................................. G02B 27/00
(52) U.S. Cl. ................. 359/578; 359/577; 359/857; 359/615; 359/260; 398/147; 398/159; 385/24
(58) Field of Search ................. 359/577, 578, 359/615, 629, 856, 857, 636, 637; 398/260, 147, 149, 161, 159; 385/24

(56) References Cited

U.S. PATENT DOCUMENTS 5,832,015 A * 11/1998 Goto ........................ 372/34
5,930,045 A * 7/1999 Shirasaki .................... 359/577

* cited by examiner

Primary Examiner—Drew Dunn
Assistant Examiner—Leo Boutsikaris
(74) Attorney, Agent, or Firm—Oblon, Spivak, McClelland, Maier & Neustadt, P.C, (57) ABSTRACT

A variable dispersion compensator comprising: an optical incidence/output device for propagating wavelength division multiplexed light; an optical multiple reflector on which the wavelength division multiplexed light emitted from the optical incidence/output device is incident for repetitive reflections; and an optical reflection device for reflecting the wavelength division multiplexed light emitted from the optical multiple reflector toward the optical multiple reflectors, the device composed of a second lens and a reflecting element and being capable of controlling the distance from the optical multiple reflector. A temperature adjusting element and a temperature detecting element are arranged via a thermal-conductive elastic member on a surface of the optical multiple reflector at a portion where no drop occurs in the intensity of the wavelength division multiplexed light incident/emitted. The temperature of the optical multiple reflector is controlled by a controller.

4 Claims, 5 Drawing Sheets

TEMPERATURE DEPENDENCE

FIG. 7

TEMPERATURE DEPENDENCE

VARIABLE DISPERSION COMPENSATOR

FIELD OF THE INVENTION

The invention relates to a variable dispersion compensator for use in optical communication systems and optical measurement fields.

BACKGROUND OF THE INVENTION

In optical communication systems using optical fibers, there has occurred wavelength dispersion of the optical fibers during signal light transmission. Therefore, compensation for the wavelength dispersion has been needed. One of the means for compensating this optical-fiber wavelength dispersion is a variable dispersion compensator that uses an optical multiple reflector made of a glass base having two reflecting faces opposed to each other. This variable dispersion compensator has been already reported in U.S. Pat. No. 5,930,045.

In general, such a variable dispersion compensator is often disposed in the cabinet of an optical amplifier. Accordingly, when, for example, a high-power laser or an erbium-doped fiber making the optical amplifier generates heat, the temperature in the cabinet of the optical amplifier rises to change the ambient use temperature of the variable dispersion compensator.

The U.S. Pat. No. 5,930,045 has proposed that a temperature sensor detects the temperature of the optical multiple reflector, and a controller controls, based on the temperature detected, a heating/cooling unit for controlling the temperature of the optical multiple reflector to adjust the temperature of the optical multiple reflector.

In this proposal, however, there is no disclosure which locations of arrangement and what methods of fixing are most desirably adopted to operate the temperature sensor and the heating/cooling unit with efficiency and prevent disturbing the function of the wavelength division multiplexed light.

Also in the foregoing U.S. Pat. No. 5,930,045, there is no disclosure as to the conception of concrete measures that can suppress vibrations of the optical multiple reflector even if the cabinet accommodating the variable dispersion compensator vibrates.

SUMMARY OF THE INVENTION

An object of the present invention is to provide a variable dispersion compensator which can suppress a change in the optical characteristics from changes in temperature and vibrations to exert favorable characteristics with stability.

To achieve the foregoing object, the present invention provides a variable dispersion compensator comprising: an optical incidence/output device for propagating wavelength division multiplexed light, composed of an optical fiber and a lens; an optical multiple reflector on which the wavelength division multiplexed light emitted from the optical incidence/output device is incident for repetitive reflections between a transmitting face and a reflecting face thereof; and a movable optical reflection device for reflecting the wavelength division multiplexed light emitted from the optical multiple reflector toward the optical multiple reflector, the movable optical reflection device composed of a lens and a reflecting element and being capable of controlling the distance from the optical multiple reflector. Here, a temperature adjusting element is arranged via a thermal-conductive elastic member on a surface of the optical multiple reflector at a portion where no drop occurs in the intensity of the wavelength division multiplexed light incident/emitted.

DETAILED DESCRIPTION

Hereinafter, a variable dispersion compensator according to the present invention will be described in conjunction with the drawings of FIGS. 1–7.

Figure 1:
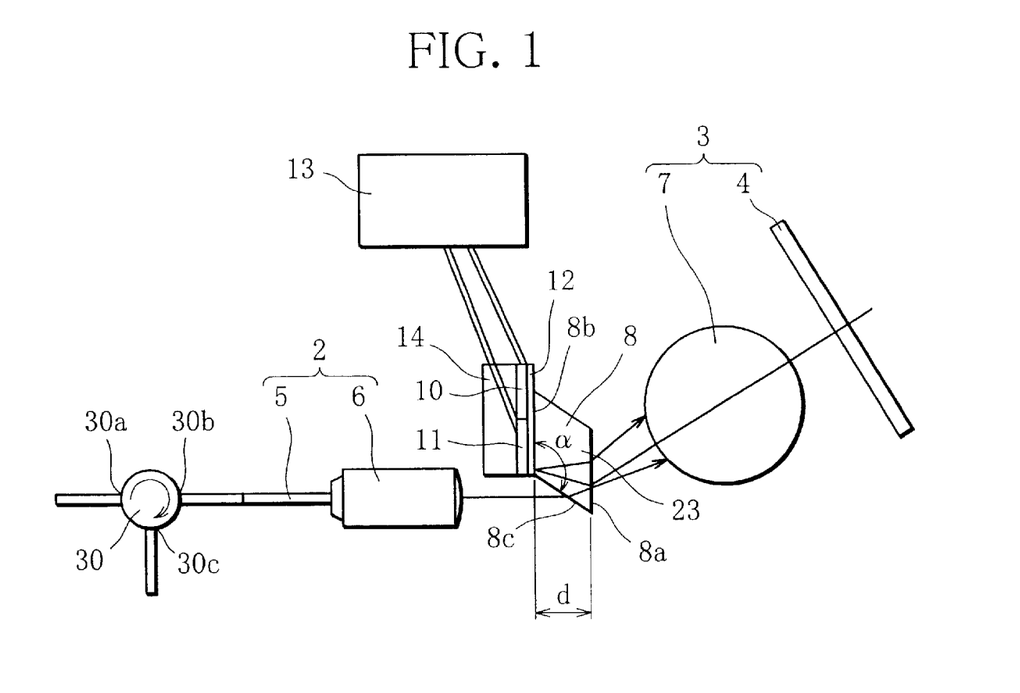
FIG. 1 is a diagram showing a variable dispersion compensator according to an embodiment of the present invention.

As shown in FIG. 1, the variable dispersion compensator according to the present embodiment comprises an optical incidence/output device 2, an optical multiple reflector 8, and a movable optical reflection device 3. The optical incidence/output device 2 is composed of an optical fiber 5 and a first lens 6 which is composed of a collimator lens and a cylindrical lens. The optical multiple reflector 8 is made of a glass base having a transmitting face 8a and a reflecting face 8b, which are opposed to each other in parallel, and an incident face 8c. The movable optical reflection device 3 includes a reflecting element 4 and a second lens 7 composed of a focusing lens.

The optical incidence/output device 2 is configured so that signal light propagated through its optical fiber 5 is incident on the incident face 8c of the optical multiple reflector 8 via the first lens 6. Signal light emitted from the movable optical reflection device 3 to be incident on the optical multiple reflector 8 propagates into the optical fiber 5 through the first lens 6. That is, the optical incidence/output device 2 combines the functions of an incidence device and an emission device for signal light.

The single-mode optical fiber 5 of the optical incidence/output device 2 is connected at one end to a port (2)30b of a three-terminal circulator 30, and at the other end to the first lens 6. Incoming wavelength division multiplexed light enters the three-terminal circulator through a port (1)30a, and is propagated to the port (2)30b.

The collimator lens, a part constituting the first lens 6, may be selected as appropriate from among spherical lenses, graded-index type lenses (GRIN lenses), aspherical lenses, and multi-mode graded fiber lenses. The cylindrical lens may be selected out of rod lenses and anamorphic prisms having the same focusing effects.

The optical multiple reflector 8, formed by faces opposed to each other in parallel, is made with glass as a base substance. The transmitting face 8a is formed on a side thereof, and the reflecting face 8b is formed on the side opposite to this transmitting face 8a. Incidentally, the glass base is preferably provided with optical-polished surfaces, having very little optical loss and a refractive index of 1.5–2.0.

Figure 2A:
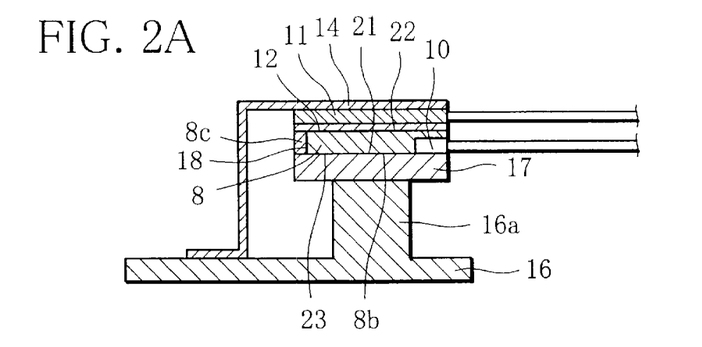
FIG. 2A is a front view showing a structure of an optical multiple reflector according to a modified example of the variable dispersion compensator of FIG. 1.

In this optical multiple reflector 8, two longitudinal sides that are orthogonal to the reflecting face 8b and the transmitting face 8a, or a longitudinal left side 22 and a longitudinal right side 23, define both the left and right sides of the optical propagation path of the optical multiple reflector 8 (see FIG. 2A).

The reflecting face 8b is provided with such a reflective film as shows a reflectance of 90% or higher with respect to the set wavelengths of the wavelength division multiplexed light. Reflectances of 99% and above are desirable. The transmitting face 8a is provided with a reflective film so as to show a reflectance of 60% or higher with respect to the set wavelengths of the wavelength division multiplexed light. Reflectances on the order of 95–98% are desirable. Because of such a configuration, part of the wavelength division multiplexed light is transmitted through and the rest is reflected from the transmitting face 8a.

As shown in FIG. 1, the incident face 8c of the optical multiple reflector 8 is one formed at an interior angle a from the reflecting face 8b. This interior angle a should be greater than 90° and smaller than 180°, preferably falling within the range of 150° and 175°. In the present embodiment, the interior angle α is set at 160°. Although not shown in the diagram, the incident face is not limited to an oblique face but may be one parallel to the transmitting face. Here, a portion having no reflective film may be arranged as an incident window for introducing the wavelength division multiplexed light. In other words, the incident face may be on an extension of the reflecting face, or equivalently, the incident face and the reflecting face 8b form an angle α=180° therebetween while a portion having no reflective film is formed to make the incident face. This interior angle α formed between the incident face 8c and the reflecting face 8b is dealt with in Japanese Patent Application No. 2001-43796. The incident face 8c may be provided with an antireflective film with respect to the set wavelengths of the wavelength division multiplexed light.

The reflecting element 4 of the movable optical reflection device 3 is composed of a plane mirror, a cylindrical mirror, or the like. A reflective film is formed thereon so as to show a reflectance of 90% or higher with respect to the set wavelengths of the wavelength division multiplexed light.

Now, the variable dispersion compensator of FIG. 1 will be described in operation.

Signal light propagated by the optical fiber 5 of the optical incidence/output device 2 is passed through the first lens 6 and incident on the incident face 8c of the optical multiple reflector 8. In the optical multiple reflector 8, the light forms focal lines parallel to the edge lines of the incident face 8c over the incident face 8c or the transmitting face 8a of the optical multiple reflector 8, or within the optical multiple reflector 8. The light repeats reflections between the opposing transmitting and reflecting faces 8a and 8b of the optical multiple reflector 8.

The reflecting face 8b reflects most of the signal light reflected from the transmitting face 8a toward the transmitting face 8a. In contrast, the transmitting face 8a transmits part of the initial incident light and the signal light reflected from the reflecting face 8b, and emits the same toward the second lens 7 of the movable optical reflection device 3.

In this way, the signal light repeats reflections between the transmitting face 8a and the reflecting face 8b inside, and is partly emitted from the transmitting-face 8a toward the second lens 7 of the movable optical reflection device 3.

By the way, the signal light transmitted through the optical fiber 5 is wavelength division multiplexed light having a plurality of wavelengths. Accordingly, through the first lens 6 of the optical incidence/output device 2, the signal light, or the wavelength division multiplexed light, forms the focal lines parallel to the edge lines of the incident face 8c of the optical multiple reflector 8 over the incident face 8c or the transmitting face 8a of the optical multiple reflector 8 or within the optical multiple reflector 8, and spreads out with the focal lines as the base lines of divergence. This results in the presence of light having a plurality of different wavelengths as many as those of the wavelength division multiplexed light as seen in any diametral direction.

Then, this wavelength division multiplexed light impinges on the transmitting face 8a, where part of the same is transmitted and the rest reflected. This wavelength division multiplexed light reflected propagates while repeating reflections within the optical multiple reflector 8 between the reflecting face 8b and the transmitting face 8a, being partly transmitted through upon each impingement on the transmitting face 8a. The wavelength division multiplexed light thus transmitted through the transmitting face 8a is emitted toward the second lens 7 of the movable optical reflection device 3.

Now, suppose that d is the parallel interval between the reflecting face 8b and the transmitting face 8a of the optical multiple reflector 8, n is the refractive index of the optical multiple reflector 8, λ is a wavelength, θ is the incident angle of the signal light from the vertical to the reflecting face 8b and the transmitting face 8a of the optical multiple reflector 8, and m is an integer. Then, the condition for light reinforcement is given by the following equation (1):

$$2nd \cdot \cos \theta = m\lambda \tag{1}$$

The optical multiple reflector 8 is already fixed in n and d. Thus, given a fixed order m, specific $\theta_1$ that satisfies the equation (1) is determined with respect to a specific wavelength $\lambda_1$. That is, for a single order m, the wavelength division multiplexed light is reinforced in different specific directions at different wavelengths on a one-on-one basis. Accordingly, the beams of the wavelength division multiplexed light having a plurality of different wavelengths can be emitted from the transmitting face 8a of the optical multiple reflector 8 into different directions by wavelength. This allows several-fold demultiplexing at the same time.

Next, the wavelength division multiplexed light emitted from the transmitting face 8a of the optical multiplex reflector 8 into different directions by wavelength propagates toward the movable optical reflection device 3. Then, through the second lens 7 composed of a spherical lens, the wavelength division multiplexed light is focused on different points on the reflecting element 4 composed of, e.g., a mirror. That is, the wavelength division multiplexed light is focused by wavelength into different points at different angles.

The wavelength division multiplexed light reflected from the reflecting element 4 is focused by the second lens 7 onto the transmitting face 8a of the optical multiple reflector 8. These beams of the wavelength division multiplexed light are incident on different points of the transmitting face 8a in different directions with the respective different wavelengths. Subsequently, the beams repeat reflections between the reflecting face 8b and the transmitting face 8a of the optical multiple reflector 8 and are emitted from the incident face 8c.

That is, while the wavelength division multiplexed light is introduced through the incident face 8c of the optical multiple reflector 8, subjected to the movable optical reflection device 3, and emitted from the incident face 8c of the optical multiple reflector 8, there occur wavelength-by-wavelength differences in the lengths of the optical paths for the plurality of different wavelengths. This consequently produces a group delay.

Therefore, when the movable optical reflection device 3 is moved to change the distance between the optical multiple reflector 8 and the second lens 7 as the distance between the second lens 7 and the reflecting element 4 is kept constant, the group delay can be changed since the lengths of the optical paths for the plurality of different wavelengths differ by wavelength.

The wavelength division multiplexed light having this group delay changed is emitted from the incident face 8c. Then, the light is passed through the first lens 6 and the optical fiber 5, introduced into the circulator 30, and transferred from the port (2)30b to the port (3)30c for output.

Now, description will be given of a first instability which results from temperature variations of the optical multiple reflector 8 and a configuration for eliminating such instability.

Due to change in the ambient use temperature of the variable dispersion compensator, the optical multiple reflector rises in temperature with an increase in the refractive index n of its glass base. The glass base also increases in thickness because of linear expansion, so that the distance between the two reflecting faces becomes greater. As a result, the optical multiple reflector changes in optical characteristics to cause a variation in the transmittance and the group delay characteristic of the variable dispersion compensator. This characteristic variation of the variable dispersion compensator resulting from temperature changes of the optical multiple reflector will be referred to as the first instability.

The elimination of the first instability is effected by arranging a temperature regulator composed of a temperature detecting element 10, a temperature adjusting element 11, and a controller 13, and adjusting the temperature of the optical multiple reflector 8 to a constant set temperature. More specifically, the temperature detecting element 10 and the temperature adjusting element 11 of the temperature regulator are attached to the optical multiple reflector 8, and the controller 13 is connected to these two elements. Then, the temperature of the optical multiple reflector 8 is detected by the temperature detecting element 10. Under the control of the controller 13, the optical multiple reflector 8 is heated or cooled through the temperature adjusting element 11 so that the temperature of the optical multiple reflector 8 is kept at the set temperature.

The temperature detecting element 10 is a thermistor, for example. The temperature adjusting element 11 is a Peltier device, for example. To make the efficient use of the temperature adjusting element 11, a heat radiating plate 14 is preferably fixed to the temperature adjusting element 11 by a fixing method of excellent heat conductivity. Consequently, the heat emitted from the temperature adjusting element 11 is conducted to the heat radiating plate 14 rapidly. An example of the fixing method is soldering.

To maintain the temperature of the optical multiple reflector 8 at a set temperature all the time, the temperature detecting element 10 and the temperature adjusting element 11 must be arranged in properly selected locations. The temperature detecting element 10 is arranged at a location where the temperature of the optical multiple reflector 8 is detected with reliability. This temperature detecting element 10 is preferably arranged in contact with the optical multiple reflector 8. The reason for this is the temperature of the optical multiple reflector 8 to be detected with reliability and accuracy.

Like the temperature detecting element 10, the temperature adjusting element 11 is also preferably arranged in contact with the optical multiple reflector 8. The reason is so that the temperature adjusting element 11 can exercise the temperature control of the optical multiple reflector 8 with efficiency and accuracy.

Hereinafter, description will be given of the locations and method for arranging the temperature detecting element 10 and the temperature adjusting element 11.

As shown in FIG. 1, the entire outer surface of the reflecting face 8b of the optical multiple reflector 8 is coated with a thermal-conductive elastic member 12. By using this thermal-conductive elastic member 12, the temperature adjusting element 11 is bonded to a location closer to the incident face 8c. Similarly, the temperature detecting element 10 is bonded to a location farther from the incident face 8c by using the thermal-conductive elastic member 12. In this way, the temperature detecting element 10 and the temperature adjusting element 11 both are put into contact with the reflecting face 8b via the thermal-conductive elastic member 12. The locations where the temperature adjusting element 11 and the temperature detecting element 10 face to face with the reflecting face 8b may be exclusively coated with the thermal-conductive elastic member 12 for the sake of bonding.

The location of arrangement of the temperature detecting element 10 is not particularly limited as long as it lies on the reflecting face 8b of the optical multiple reflector 8 except where the temperature adjusting element 11 is bonded. For example, the temperature detecting element 10 may be partially bonded to the reflecting face 8b of the optical multiple reflector 8 with the other part extending off the reflecting face 8b.

Moreover, the locations of arrangement of the temperature adjusting element 11 and the temperature detecting element 10 are not particularly limited to the outer surface of the reflecting face 8b of the optical multiple reflector 8 mentioned above. For example, anywhere on a surface of the optical multiple reflector 8 is applicable unless interrupting optical paths. The reason for the confines of optical-path-uninterrupting locations is that if the temperature adjusting element 11 etc. were arranged at optical-path-interrupting locations, the signal light might drop in intensity. Examples of the locations uninterrupting optical paths are the longitudinal left side 22 of the optical multiple reflector 8 (see FIG. 2A. In FIG. 1, corresponding to the surface on the far side of the longitudinal right side 23) and the longitudinal right side 23 which is the opposing counterpart of the longitudinal left side 22. The temperature adjusting element 11 etc. may be arranged in these locations.

Further, the temperature adjusting element 11 and the temperature detecting element 10 may be arranged in locations interrupting the optical paths, such as the incident face 8c and the transmitting face 8a, unless the arrangement causes a drop in optical intensity. Such locations where no drop occurs in optical intensity will be described later.

As mentioned above, the temperature detecting element 10 and the temperature adjusting element 11 are bonded to the optical multiple reflector 8 by means of the thermal-conductive elastic member 12. Therefore, in order to control the temperature of the optical multiple reflector 8 with accuracy and efficiency, the thermal-conductive elastic member 12 needs to have an excellent thermal conductivity.

The thermal-conductive elastic member 12 creates a bonding interface between the temperature adjusting and detecting elements 11, 10 and the optical multiple reflecting member 8 upon bonding. Here, bonding stress can sometimes yield a photoelastic effect through this interface so that the optical multiple reflector 8 suffers refractive-index anisotropy on the reflecting face 8b, the transmitting face 8a, or other glass faces.

Therefore, the thermal-conductive elastic member 12 must be such that bonding stress resulting from linear expansion will not yield a photoelastic effect in the optical multiple reflector 8. That is, the thermal-conductive elastic member 12 needs to be an elastic member that is flexible from low temperatures of, e.g., −20° C. or so to high temperatures of, e.g., 80° C. or so after crosslinked. The reason for this is that if not flexible, the thermal-conductive elastic member 12 can fail to absorb the bonding stress acting on the optical multiple reflector 8 and cause a photoelastic effect due to its own linear expansion.

Among preferable thermal-conductive elastic members 12 satisfying the above-described condition are rubber elastic members that have silicon- or urethane-type polymers as their bases, compounded with fillers of favorable thermal conductivity such as metal oxides and metals. The rubber elastic members are divided into elastomer-types having greater modulus of elasticity and gel-types having smaller modulus of elasticity. A difference between the elastomer and gel types lies in crosslink density. The former are high in crosslink density, and the latter are low. The two types differ by two digits or so in the modulus of elasticity.

The modes of crosslinking typically include one-component room temperature crosslinking, one-component heat crosslinking, two-component room temperature crosslinking, and two-component heat crosslinking. In using the heat crosslinking type, crosslinking is effected in a temperature atmosphere within the range not affecting the other parts. In the present embodiment, 100° C. and under are preferable.

Examples of the above-mentioned silicon rubbers of elastomer type that are commercially available are SE4420, SE4422, SE4450, SE4486, and DA6522 from Toray Dow Corning Silicon Co., Ltd. The gel-types include SE4440 and SE4445. For physical properties, these silicon rubbers have coefficients of linear expansion of $1.5 \times 10^{-4}$ to $2.0 \times 10^{-4}$ (1/K), modulus of elasticity of 0.08 to 10.5 MPa, and thermal conductivities of $2.0 \times 10^{-3}$ to $5.0 \times 10^{-3}$ (cal/cm·sec·° C.).

The gel types are low in the modulus of elasticity of their polymers, and remain on the order of 0.08 MPa even when compounded with fillers. High thermal conductivities can be obtained by using the polymers of this gel type and further increasing the amounts of thermal-conductive fillers to be compounded. The gel-types are suited for this composition due to the smaller modulus of elasticity of their base polymers. That is, the gel-types compounded with yet greater amounts of thermal-conductive fillers increase in thermal conductivity and the modulus of elasticity, and decrease in the coefficient of linear expansion.

The modulus of elasticity is tested in conformance with the tensile stress test method in JISK6251. Dumbbell specimens to be used are of JIS No. 3. In the test, a tensile tester is used to measure the relationship between the coefficient of extension and tensile strength. From the measurements, the modulus of elasticity is determined as the gradient of the relationship therebetween.

In the manner described above, the temperature of the optical multiple reflector 8 can be kept at a constant set temperature by bonding the temperature detecting element 10 and the temperature adjusting element 11 to the outer surface of the reflecting face 8b of the optical multiple reflector 8 via the thermal-conductive elastic member 12 and exercising temperature control by the controller 13.

Figure 6:
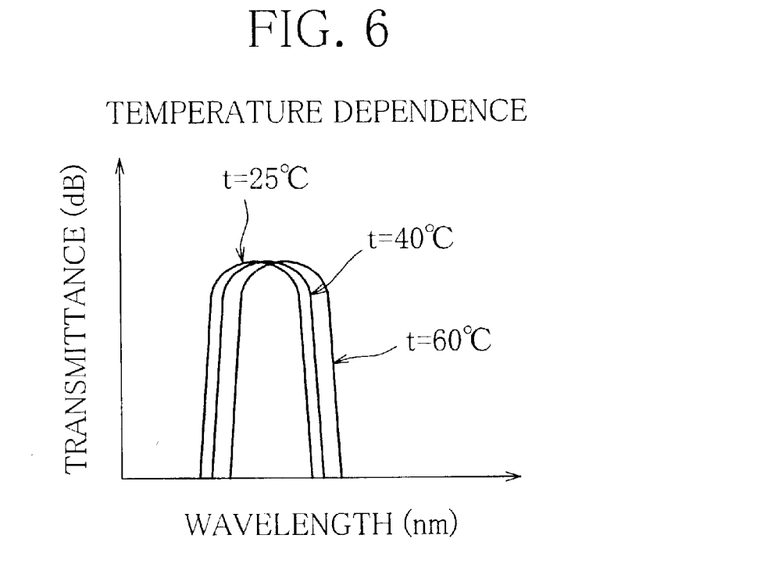
FIG. 6 is a graph showing a transition of the transmittance characteristic on center wavelength concerning the temperature characteristic of a variable dispersion compensator without a temperature regulator.
Figure 7:
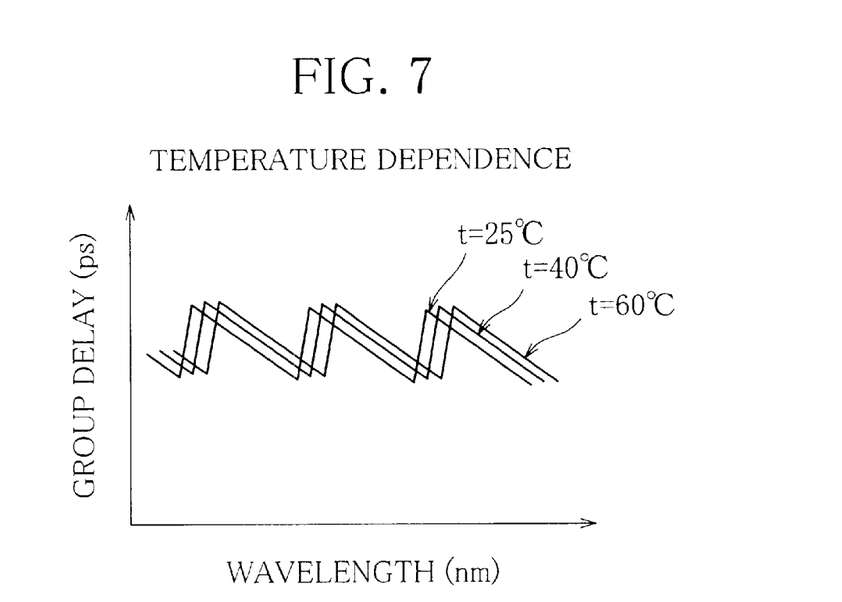
FIG. 7 is a graph showing a transition of the group delay characteristic on wavelength concerning the temperature characteristic of a variable dispersion compensator without a temperature regulator.

When such a temperature adjusting element 11 or the like is not arranged according to a change in the ambient use temperature, the glass base of the optical multiple reflector 8 varies in refractive index n and in thickness, or the distance between the transmitting face 8a and the reflecting face 8b, due to linear expansion. This causes variations in the optical properties of the optical multiple reflector 8. For example, variations occur in the center wavelength of the transmittance of the variable dispersion compensator shown in FIG. 6 and in the profile of the group delay characteristic shown in FIG. 7. Specifically, as shown in FIGS. 6 and 7, the center wavelength of the transmittance and the profile of the group delay characteristic shift to longer wavelengths as the optical multiple reflector 8 increases in temperature.

In contrast, when the optical multiple reflector 8 is kept at a constant set temperature as in the present embodiment, it is possible to suppress the temperature dependence of the transmittance and the group delay characteristic of the variable dispersion compensator. That is, the first instability described above can be eliminated.

Next, description will be given of a second instability which results from vibrations of the optical multiple reflector 8 and a configuration for eliminating such instability.

The second instability is a characteristic variation of the variable dispersion compensator that results from vibrations of the optical multiple reflector. When the optical multiple reflector vibrates, its two reflecting faces and its incident face for signal light to be incident on are affected by the vibrations. Then, the optical characteristics of the optical multiple reflector change to cause a variation in the characteristics of the variable dispersion compensator.

FIGS. 2A, 2B, 2C, and 2D show an example of a holding structure of the optical multiple reflector 8. This holding structure illustrates an example different from the one shown in FIG. 1.

Figure 2B:
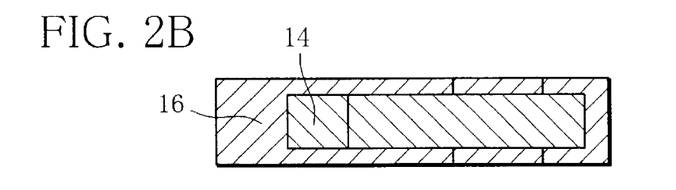
FIG. 2B is a plan view showing the structure of FIG. 2A.
Figure 2C:
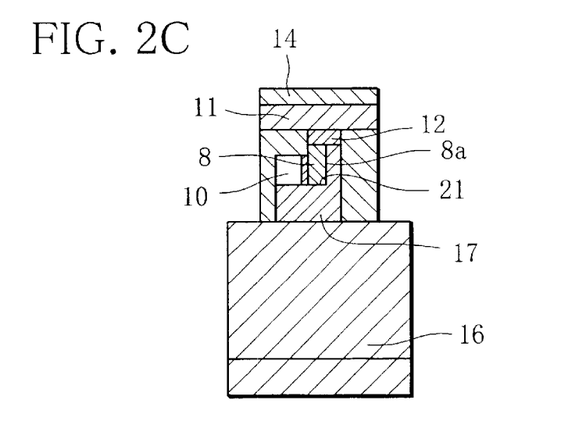
FIG. 2C is a side view showing the structure of FIG. 2A.

As shown in FIGS. 2A, 2B, and 2C, the holding structure of the optical multiple reflector 8 comprises a support base 16 and a holder 17 fixed thereto. The optical multiple reflector 8 is mounted on the holder 17. The temperature adjusting element 11 is bonded to the optical multiple reflector 8 via the thermal-conductive elastic member 12, and the heat radiating plate 14 is arranged on the temperature adjusting element 11. That is, the optical multiple reflector 8 is sandwiched between the support base 16 and the heat radiating plate 14 via the holder 17 and the temperature adjusting element 11, respectively.

The optical multiple reflector 8 is in contact with a mounting surface 21 of the holder 17 at one side, or the longitudinal right side 23. The other side, or the longitudinal left side 22, is opposed to and put in contact with the temperature adjusting element 11 across the thermal-conductive elastic member 12, and is fixed to the temperature adjusting element 11 by the thermal-conductive elastic member 12.

Figure 4A:
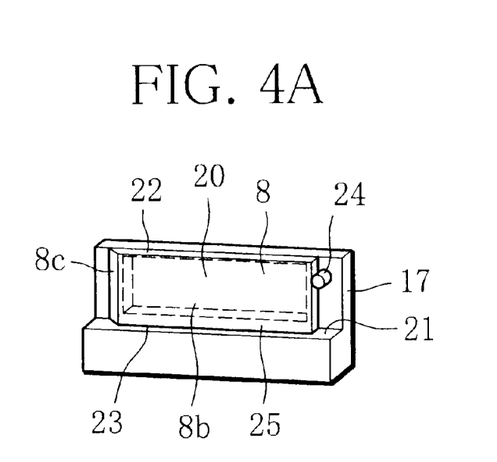
FIG. 4A is a perspective view showing an example of the holder of FIGS. 2A and 2C.

The transmitting face 8a of the optical multiple reflector 8 is bonded by a thermosetting adhesive such as an epoxy-type adhesive, so as to be in contact with the peripheral wall of an opening 20 in the holder 17 or an overlapping support frame 25 shown in FIG. 4A. The holder 17 is fixed to the support base 16 by YAG laser welding.

On a protrusion 16a of the support base 16, the holder 17 is fine adjusted in position so as to adjust the angle formed between the wavelength division multiplexed light emitted from the first lens 6 (see FIG. 1) and the incident face 8c of the optical multiple reflector 8. After the adjustment, the bottom of the holder 17 is YAG-laser-welded to the protrusion 16a of the support base 16. Such separate arrangement of the holder 17 and the support base 16 advantageously facilitates the adjustment of the optical system.

The heat radiating plate 14 is solder-fixed at one end to the top of the temperature adjusting element 11, i.e., to the surface of the same on the opposite side from the optical multiple reflector 8. The other end of the heat radiating plate 14 is fixed to the support base 16 with a screw. That is, the heat radiating plate 14 and the holder 17 are both fixed to the support base 16.

When the heat radiating plate 14 is fixed as described above, the bonding of the optical multiple reflector 8 and the temperature adjusting element 11 is effected by the thermal-conductive elastic member 12. Therefore, the force to originate vibrations between the heat radiating plate 14 and the holder 17, which are both fixed to the support base 16, is absorbed by the thermal-conductive elastic member 12. That is, vibrations of the incident face 8c, the reflecting face 8b, and the transmitting face 8a of the optical multiple reflector 8 become smaller.

Moreover, in the above-described structure, the heat radiating plate 14 and the holder 17 have opposing portions. When the force acting between the heat radiating plate 14 and the holder 17 functions to widen the interval between the heat radiating plate 14 and the holder 17, the heat radiating plate 14 acts to narrow the interval from the holder 17 across the thermal-conductive elastic member 12 due to its spring function. On the other hand, when the force acting between the heat radiating plate 14 and the holder 17 functions to narrow the interval between the heat radiating plate 14 and the holder 17, the heat radiating plate 14 functions to widen the interval from the holder 17 across the thermal-conductive elastic member 12 due to its spring function.

This configuration described above makes the thermal-conductive elastic member 12 absorb the force to originate vibrations between the heat radiating plate 14 and the holder 17 which are both fixed to the support base 16. At the same time, the heat radiating plate 14 also functions as a spring. As a result, it becomes possible to cut down the vibrations of the incident face 8c, the reflecting face 8b, and the transmitting face 8a of the optical multiple reflector 8. Thereby, the second instability described above can be eliminated.

Incidentally, the support base 16 has rigidity higher than that of the heat radiating plate 14. The support base 16 and the holder 17 are made of stainless steel. For example, typical stainless steel SUS304 has a coefficient of linear expansion of $16.4 \times 10^{-6}$/K. While the thicknesses of the support base 16 and the holder 17 vary with locations, the thinnest portions, or the portions of the lowest rigidity, have a thickness of, e.g., 2 mm. In contrast, the heat radiating plate 14 is made of metal material having excellent thermal conductivity, such as aluminum and copper. The thickness is 1 mm, for example. The width is smaller than that of the support base 16. Consequently, the support base 16 is higher than the heat radiating plate 14 in rigidity.

Thus, in consideration of both the first and second instabilities, the thermal-conductive elastic member 12 must be made of an adhesive material having excellent thermal conductivity and high elasticity.

Now, with reference to FIGS. 2A, 2B, and 2C, description will be given in further detail of the configuration in the vicinity of the optical multiple reflector 8. Here, the conceptual arrangement of the optical incidence/output device 2, the movable optical reflection device 3, and the controller 13 is the same as in FIG. 1. Besides, the materials of the portions making the optical parts are also the same as in FIG. 1.

As shown in FIG. 2A, the support base 16 supports the holder 17. In terms of fabrication processes, the holder 17 is fine adjusted in position on the support base 16, so as to adjust the angle formed between the wavelength division multiplexed light emitted from the first lens 6 (see FIG. 1) and the incident face 8c of the optical multiple reflector 8. Then, the contact portion between the support base 16 and the holder 17 is welded with a YAG laser.

In FIG. 2A, the protrusion 16a such as makes contact with the bottom of the holder 17 is formed on the support base 16 over the area where the bottom of the holder 17 and the support base 16 are opposed to each other. This protrusion 16a need not be formed, however. That is, the bottom of the holder 17 and the support base 16 have only to be in contact with each other across the area where they are opposed to each other. Accordingly, though not shown in the diagram, the protrusion 16a shown in FIG. 2A may be flattened.

Moreover, though not shown in the diagram, a recess having the shape of the bottom of the holder 17 may be formed in the support base 16 at a portion where to attach the holder 17, so that the holder 17 is positioned thereby. In any case, such separate arrangement of the holder 17 and the support base 16 advantageously allows the fine adjustment of the optical system.

In the diagram, the optical multiple reflector 8 mounted on the holder 17 shows its reflecting face 8b. The backside of the reflecting face 8b not shown in the diagram is the transmitting face 8a (see FIG. 1). The incident face 8c is located on the left side of the reflecting face 8b of the optical multiple reflector 8 as seen in FIG. 2A. The reflecting face 8b and the incident face 8c are sectioned by a line portion 18 shown in the diagram. Incidentally, the temperature detecting element 10 is bonded to the rightmost side of the reflecting face 8b of the optical multiple reflector 8 with the thermal-conductive elastic member 12.

The wavelength division multiplexed light entering through the incident face 8c repeats reflections and transmittances between the transmitting face 8a (see FIG. 1) and the reflecting face 8b of the optical multiple reflector 8, while propagating toward the right end of the optical multiple reflector 8 in FIG. 2A. As this wavelength division multiplexed light propagates toward the right end, part of the wavelength division multiplexed light undergoes transmittances. Upon each transmittance, the light energy propagating through the optical multiple reflector 8 decreases.

Therefore, the influence of the reflections and transmittances becomes rid after some propagation of the wavelength division multiplexed light rightward through the optical multiple reflector 8. On the reflecting face 8*b* or the transmitting face 8*a* (see FIG. 1) at the far right portion of the optical multiple reflector 8 where the influence vanishes, the temperature detecting element 10 may be arranged and bonded with an adhesive such as yields a photoelastic effect. The reason for this is that the impact of the photoelastic effect decreases as the location gets closer to the right end of the optical multiple reflector 8. This is the primary reason why the temperature detecting element 10 is arranged on the rightmost end of the optical multiple reflector 8. The adhesive, however, preferably uses the thermal-conductive elastic member 12 so that the temperature of the optical multiple reflector 8 is conducted to the temperature detecting element 10 accurately.

Here, the portion where the influence of the reflections and transmittances vanishes is defined as a portion where no drop occurs in the intensity of propagating light even if any optical-path-interrupting object is arranged thereon. Then, whether a drop in optical intensity occurs or not is determined by the following manner. Initially, as none of the temperature adjusting element 11 and others is arranged on the optical multiple reflector 8, wavelength division multiplexed light enters into the optical multiple reflector 8 from the port (1)30*a* of the circulator 30 (see FIG. 1). Then, the optical intensity of the wavelength division multiplexed light from the optical multiple reflector 8 is measured with an optical intensity detector (not shown) connected to the port (3)30*c* of the circulator 30 (see FIG. 1). The value of this optical intensity will be referred to as A. Then, the optical multiple reflector 8 is provided with the temperature adjusting element 11 and others, and is similarly measured for optical intensity. The value of this optical intensity will be referred to as B. If A and B are identical in value, the location of arrangement of the temperature adjusting element 11 and others is a portion where no drop occurs in optical intensity. On the other hand, if A>B, the location of arrangement of the temperature adjusting element 11 and others is a portion where a drop occurs in optical intensity. This portion is unsuited for the location of arrangement.

When the temperature adjusting element 11 and the temperature detecting element 10 are arranged on such portion, both of them are preferably bonded with the thermal-conductive elastic member 12. The reason for this is that the use of the same adhesive allows efficient work, and that the temperature of the optical multiple reflector 8 can be detected with accuracy and efficiency.

The favorable condition for the locations of arrangement of the temperature detecting element 10 is the same as that of the temperature adjusting element 11. More specifically, the favorable locations of arrangement include portions so far away from the incident face 8*c* of the optical multiple reflector 8 that the influence of reflections and transmittances vanishes, i.e., where the photoelastic effect have no impact. Portions of the reflecting face 8*b* and the transmitting face 8*a* where no drop occurs in optical intensity are also included. The thermal-conductive elastic member 12 is preferably used to arrange the temperature detecting element 10 with smaller impact of the photoelastic effect. Another advantage of using the thermal-conductive elastic member 12 lies in that the smaller impact of the photoelastic effect allows a reduction in the distance from the incident face 8*c* of the optical multiple reflector 8 to the location of bonding. The result is that the temperature can be detected of the portion where the wavelength division multiplexed light makes incidence/output and reflection frequently. This allows temperature detection at the portion that has a highest effect on the group delay characteristic and the transmittance characteristic.

Now, referring to FIG. 2D, description will be given of the case where the temperature adjusting element 11 and the heat radiating plate 14 are arranged on an optical-intensity-dropping portion of the reflecting face 8*b* of the optical multiple reflector 8.

Figure 2D:
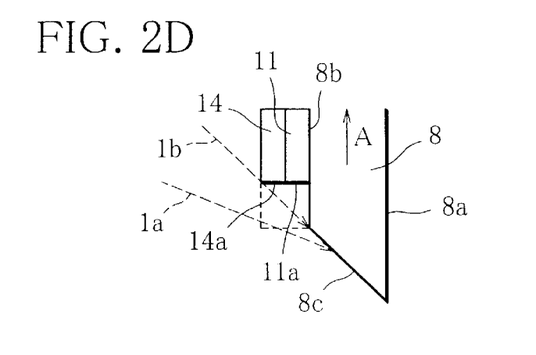
FIG. 2D is a diagram showing the arrangement of a temperature adjusting element and a heat radiating plate on the optical multiple reflector and the relationship of the same to the optical path of light propagated.

As shown in FIG. 2D, the temperature adjusting element 11 and the heat radiating plate 14 are arranged at locations not interrupting the beam optical path 1*a* of the incident light. That is, the temperature adjusting element 11 and the heat radiating plate 14 are arranged so that their respective end surfaces 11*a* and 14*a* are positioned not to protrude toward the incident face 8*c* beyond an extension 1*b* of the incident face 8*c*, or equivalently, positioned in the the A direction, in FIG. 2D, away from the extension 1*b* of the incident face 8*c*. The temperature adjusting element 11 and the heat radiating plate 14 shown by full lines in FIG. 2D are in the corresponding positions. If the end surfaces 11*a* and 14*a* thereof were positioned on the incident-face-8*c* side of the extension 1*b*, or equivalently, the temperature adjusting element 11 and the heat radiating plate 14 were arranged in the position shown by the dotted line in FIG. 2D, the optical path 1*a* would be interrupted by the temperature adjusting element 11 or the heat radiating plate 14. While the foregoing has described the locations of arrangement of the temperature adjusting element 11 and the heat radiating plate 14, the temperature detecting element 10 is also arranged not to interrupt the optical path 1*a* as described above.

Arranging the temperature detecting element 10 as described above allows a proper grasp of the temperature of the optical multiple reflector 8, so that the temperature of the optical multiple reflector 8 can be effectively controlled by the controller 13. Accordingly, by using the thermal-conductive elastic member 12, the temperature detecting element 10 and the temperature adjusting element 11 can be bonded to near the incident face 8*c* of the optical multiple reflector 8 where transmittances and reflections of the wavelength division multiplexed light are repeated frequently.

Now, description will be given of the structure and arrangement of the heat radiating plate 14.

FIG. 2B shows the heat radiating plate 14 which is arranged to cover the holder 17, the optical multiple reflector 8, the temperature detecting element 10, and the temperature adjusting element 11 shown in FIG. 2A. This shape is not indispensable, however. In FIG. 2A, the bent of the heat radiating plate 14 is positioned on the left of the contact portion between the temperature adjusting element 11 and the heat radiating plate 14. The heat radiating plate 14 and the support base 16 are screw-fixed at the contact portion between the heat radiating plate 14 and the support base 16.

Nevertheless, in FIG. 2A, the bent of the heat radiating plate 14 may be arranged before or behind at least part of a longitudinal side of the contact portion between the temperature adjusting element 11 and the heat radiating plate 14. The portion of the heat radiating plate 14 that has the bent and is connected to the support base 16 can sometimes interrupt the wavelength division multiplexed light. Therefore, the heat radiating plate 14 must be arranged so that the incident light or transmitted light to/from the optical multiple reflector 8 is undisturbed. To operate the temperature adjusting element 11 efficiently, the heat radiating plate 14 and the temperature adjusting element 11 preferably have a wider contact area therebetween.

Thus, at least part of a longitudinal side of the contact portion between the temperature adjusting element 11 and the heat radiating plate 14 must be made as long as possible. The heat radiating plate 14 must be arranged with consideration given to its entire shape so that the incident light or transmitted light to/from the optical multiple reflector 8 is not disturbed by the portion of the heat radiating plate 14 that has the bent and is connected to the support base 16.

Next, with reference to FIGS. 2A and 2C, description will be given of the arrangement of the optical multiple reflector 8.

The transmitting face 8a (see FIG. 1) of the optical multiple reflector 8 is partially bonded to the holder 17 with an epoxy-type adhesive. Between the longitudinal sides of the optical multiple reflector 8 orthogonal to the reflecting face 8b and the transmitting face 8a (see FIG. 1), the longitudinal right side 23 is put into contact with the mounting surface 21 of the holder 17. The other, longitudinal left side 22 is bonded to the temperature adjusting element 11 with the thermal-conductive elastic member 12.

In this case, the bonding area between the longitudinal left side 22 and the temperature adjusting element 11 is narrow. Therefore, the bonding area of the longitudinal left side 22 to the thermal-conductive elastic member 12 is made flush with the top end of the holder 17 to extend the bonding area. With the bonding area extended thus, the longitudinal left side 22 and the temperature adjusting element 11 are bonded with the thermal-conductive elastic member 12.

Figure 3:
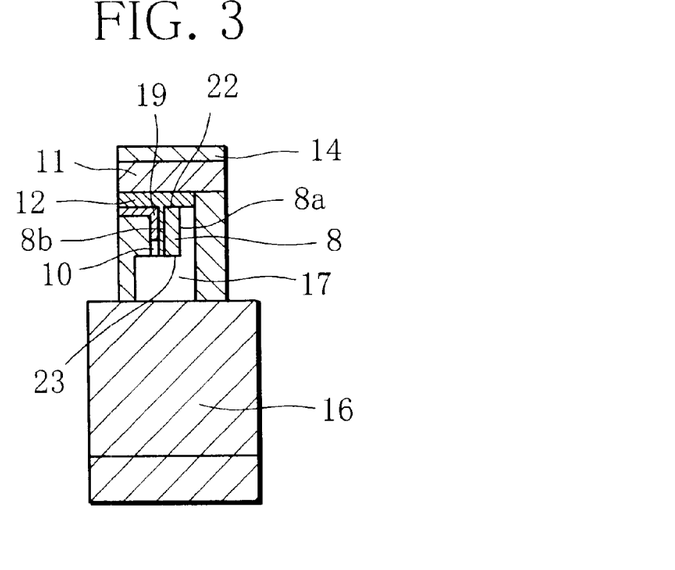
FIG. 3 is a side view showing a modified example of the structure of the optical multiple reflector of FIG. 2C, provided with a heat radiating member.

The temperature of the optical multiple reflector 8 can be controlled with higher efficiency as much as the bonding area between the longitudinal left side 22 and the temperature adjusting element 11 is extended. As a measure thereof, another modified example is shown in FIG. 3. FIG. 3 shows the configuration of FIG. 2C to which a heat radiating member 19 is added. The heat radiating member 19 is opposed to part or the whole of the reflecting face 8b of the optical multiple reflector 8, and is bonded with the thermal-conductive elastic member 12. For higher radiation efficiency, the heat radiating member 19 favorably has such a shape as increases the portion opposed to the temperature adjusting element 11.

The above-mentioned opposing portion by itself is too narrow, for only the longitudinal left side 22 and the thickness portion of the heat radiating member 19 are added to the bonding area with the temperature adjusting element 11, leaving an area where the temperature adjusting element 11 and the heat radiating member 19 are not opposed to each other. Then, the opposing portion between the temperature adjusting element 11 and the heat radiating member 19 is configured to be wider. The heat radiating member 19 is configured so as to face the reflecting face 8b of the optical multiple reflector 8 across its portion other than where the temperature adjusting element 11 and the heat radiating member 19 are opposed to each other. For example, the heat radiating member 19 is worked into an L in cross section. Moreover, a configuration for maximizing the contact area between the heat radiating member 19 and the air is preferable. For example, the surface of the heat radiating member 19 is preferably worked into asperities or a corrugated shape for an increased contact area with the air.

FIG. 3 shows an example of the heat radiating member 19 that has a preferred shape described above. The heat radiating member 19 is worked so as to face the entire reflecting face 8b of the optical multiple reflector 8. A wing is extended from the end closer to the longitudinal left side 22 of the optical multiple reflector 8 so as to face the temperature adjusting element 11 widely over an area where the temperature adjusting element 11 and the heat radiating member 19 are not opposed to each other. The heat radiating member 19 is shaped to increase the opposing area with the temperature adjusting element 11 and the contact area with the air. Incidentally, this heat radiating member 19 is bonded to the optical multiple reflector 8 and the temperature adjusting element 11 at the respective opposing areas by the thermal-conductive elastic member 12.

Now, the arrangement of the individual components will be described with reference to FIG. 3.

The temperature detecting element 10 shall be arranged as appropriate. The heat radiating member 19 is one opposed to the entire reflecting face 8b of the optical multiple reflector 8, provided with the wing extended from the end closer to the longitudinal left side 22 of the optical multiple reflector 8. That is, the heat radiating member 19 shows the shape of an inverted L as seen in a cross section perpendicular to the longitudinal direction of the optical multiple reflector 8.

Although not shown in the diagram, the heat radiating member 19 may be one opposed to the entire reflecting face 8b of the optical multiple reflector 8, provided with wings extended to both sides from the end closer to the longitudinal left side 22 of the optical multiple reflector 8. In other words, the heat radiating member 19 may have the shape of a "T" as seen in a cross section perpendicular to the longitudinal direction of the optical multiple reflector 8. Since the area opposed to the temperature adjusting elemental increases as compared to the L shape, the temperature control of the optical multiple reflector 8 can be performed with higher efficiency.

Accordingly, arranging the heat radiating member 19 as shown in FIG. 3 can further widen the contact portion between the temperature adjusting element 11 and the heat radiating member 19 with an improvement in the heat radiation effect.

The heat radiating member 19 is bonded by the thermal-conductive elastic member 12 applying to the reflecting face 8b of the optical multiple reflector 8. The result is that the heat of the optical multiple reflector 8 is radiated efficiently, and evenly at the reflecting face 8b. On this account, the temperature gradients inside the optical multiple reflector 8 decrease around the longitudinal left side 22 and the longitudinal right side 23 of the optical multiple reflector 8. This makes the optical multiple reflector 8 less prone to refractive-index anisotropy, allowing isotropy to be maintained. The heat radiating member 19 is made of metal material having excellent thermal conductivity such as aluminum and copper, whereas it is not limited thereto.

Here, the temperature detecting element 10 may be arranged on the above-described portion of the transmitting face 8a of the optical multiple reflector 8 where no drop occurs in optical intensity. For example, though not shown in the diagram, the temperature detecting element 10 is arranged on the transmitting face 8a at the farthermost position from the incident face 8c.

FIG. 3 shows an example where a hole for arranging the temperature detecting element 10 is formed in a part of the heat radiating member 19. That is, the heat radiating member 19 is partially cut off as large as the temperature detecting element 10 so that the temperature detecting element 10 is arranged in the cut part. The part to be cut off is not particularly limited, whereas it favorably falls on the reflecting face 8b near the incident face 8c where multiple reflections are made frequently.

In FIG. 3, the temperature adjusting element 11 is fixed to the heat radiating plate 14 by soldering or with the thermal-conductive elastic member 12. When the thermal-conductive elastic member 12 is employed, an adhesive used in the other portions is used with higher working efficiency, therefore, the adhesive that is used to bond the optical multiple reflector 8 and the temperature adjusting element 11 is also used here. When the temperature adjusting element 11 and the heat radiating plate 14 are bonded to each other with the thermal-conductive elastic member 12, it follows that two layers of absorbers lie between the heat radiating plate 14 and the optical multiple reflector 8. This makes the optical multiple reflector 8 more less prone to move.

The heat radiating plate 14 and the support base 16 are, as in FIG. 2A, screw-fixed at the contact portion between one end of the heat radiating plate 14 and the support base 16. Since the thermal-conductive elastic member 12 is interposed between the holder 17 and the heat radiating plate 14, vibrations acting between the holder 17 and the heat radiating plate 14 are absorbed by the thermal-conductive elastic member 12, making the optical multiple reflector 8 less prone to move. In addition, the holder 17 and the heat radiating plate 14 each are fixed to the support base 16. Since the support base 16 has higher rigidity than that of the heat radiating plate 14, the heat radiating plate 14 functions as a spring. The spring function of the heat radiating plate 14 acts to prevent the thermal-conductive elastic member 12 from receiving forces. As a result, the optical multiple reflector 8 becomes less prone to move.

Now, description will be given of the holder 17 with reference to FIG. 4A.

The holder 17 is composed of the mounting surface 21 and the overlapping support frame 25 for bonding part of the top, bottom, right, and left edges of the optical multiple reflector 8 around the opening 20. The outside of the dotted-lined frame is the overlapping support frame 25. The inside of the dotted-lined frame is the opening 20. Part of the optical multiple reflector 8 is bonded to the overlapping support frame 25, at either the reflecting-face-8b side or the transmitting-face-8a side (see FIG. 1) according to need. As seen in a cross section orthogonal to the longitudinal direction of the optical multiple reflector 8, the mounting surface 21 and the overlapping support frame 25 form the shape of an inverted L.

The overlapping support frame 25 is formed around the opening 20, and is bonded to part of the top, bottom, right, and left edges of the optical multiple reflector 8. When the optical multiple reflector 8 is bonded to the overlapping support frame 25 at the reflecting-face-8b side, the overlapping support frame 25 can possibly interrupt the optical path to the incident face 8c with diffraction of the wavelength division multiplexed light. In such cases, the holder shall be configured not to interrupt the optical path to the incident face 8c.

Figure 4B:
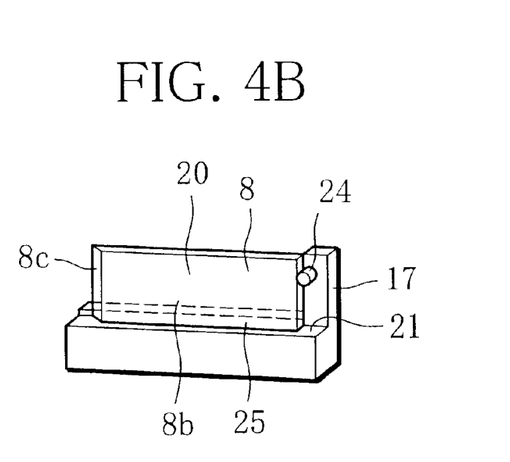
FIG. 4B is a perspective views showing a modified example of the holder of FIG. 4A.

That is, when the optical multiple reflector 8 is arranged with the overlapping support frame 25 on the incident-face-8c side, the incident light is interrupted by the peripheral wall if the holder 17 having the peripheral wall as shown in FIG. 4A is used. Thus, a holder 17 having an open space with no peripheral wall as shown in FIG. 4B is used instead to prevent the interruption of the incident light by the peripheral wall. The holder 17 having an open space favorably reduces the impact of the diffraction of the wavelength division multiplexed light, with an advantage of increased design flexibility. Incidentally, a protrusion 24 shown in FIGS. 4A and 4B is a locator for the optical multiple reflector 8.

Now, with reference to FIGS. 5A, 5B, 5C, and 5D, description will be given of an example of the concrete configuration around the optical multiple reflector 8 according to the modified example of the variable dispersion compensator of FIG. 1. Here, the conceptual arrangement of the optical incidence/output device 2, the movable optical reflection device 3, and the controller 13 is the same as in FIG. 1. In addition, the materials of the optical parts are also the same as in FIG. 1. As for the structure of the holder 17, reference will be made to FIGS. 4A and 4B.

Figure 5A:
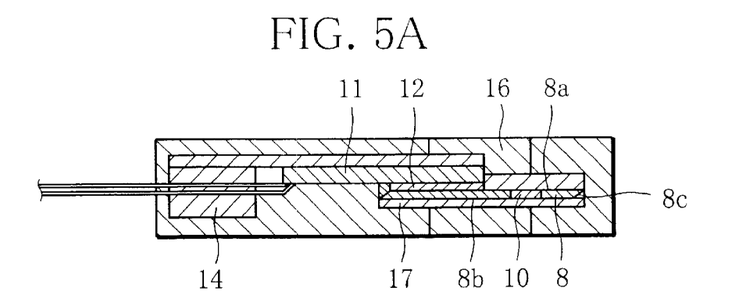
FIG. 5A is a plan view showing the peripheral structure of an optical multiple reflector according to the modified example of FIG. 1.
Figure 5B:
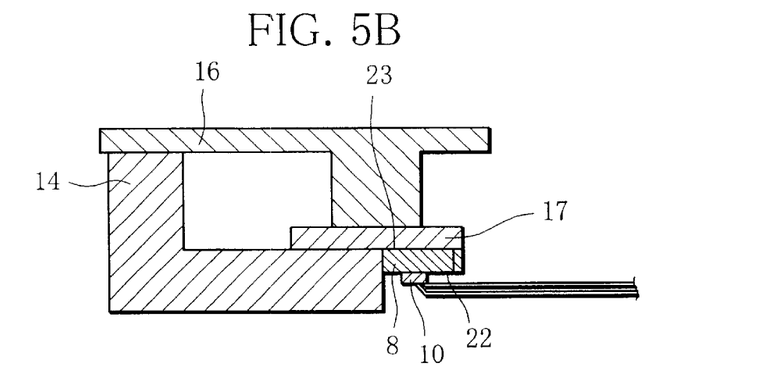
FIG. 5B is a front view showing the peripheral structure of FIG. 5A.

Referring to FIG. 5B, description will be given of the configuration and arrangement of the holder 17 and the support base 16. The support base 16 supports the holder 17. The support base 16 and the holder 17 are welded with a YAG laser. In FIG. 5B, the support base 16 is provided with a protrusion over the portion where to make contact with the bottom of the holder 17. Nevertheless, as described above, the support base 16 has only to make contact with the bottom of the holder 17 across the opposing portion. Thus, the surface of the support base 16 may be linear (flat) in FIG. 5B. Incidentally, this structure is just as described with reference to FIG. 2A.

Figure 5C:
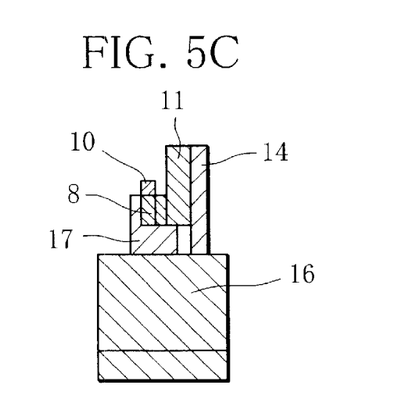
FIG. 5C is a side view showing the peripheral structure of FIG. 5A.

Referring to FIGS. 5A and 5C, description will be given of the configuration and arrangement of the optical multiple reflector 8, the holder 17, the thermal-conductive elastic member 12, the temperature detecting element 10, and the heat radiating plate 14. The reflecting face 8b of the optical multiple reflector 8 is bonded to the peripheral wall of the opening 20 in the holder 17, or the overlapping support frame 25, with an epoxy-type adhesive. One of the longitudinal sides of the optical multiple reflector 8 orthogonal to the reflecting face 8b and the transmitting face 8a, the longitudinal right side 23 is put into contact with the mounting surface 21 of the holder 17.

By using the thermal-conductive elastic member 12, the temperature detecting element 10 is bonded to the longitudinal left side 22 at a location closer to the incident face 8c, one of the both sides of the reflecting face 8b and the transmitting face 8a where the wavelength division multiplexed light repeats reflections and transmittances actively. At this location, the wavelength division multiplexed light has greater energy, i.e., higher reflection power and higher transmittance power. While the temperature detecting element 10 is bonded to the longitudinal left side 22 of the optical multiple reflector 8 by using the thermal-conductive elastic member 12, there occurs no refractive-index anisotropy in the bonding area.

Therefore, bonding the temperature detecting element 10 to the longitudinal left side 22 with the thermal-conductive elastic member 12 causes no optical hindrance, allowing efficient detection of the temperature of the optical multiple reflector 8.

The temperature adjusting element 11 is bonded to the transmitting face 8a of the optical multiple reflector 8 via the thermal-conductive elastic member 12. Here, the temperature adjusting element 11 shall be bonded to the above-described portion where no drop occurs in optical intensity. The temperature adjusting element 11 and the heat radiating plate 14 are fixed by soldering or with an adhesive having thermal conductivity. This adhesive can use the thermal-conductive elastic member 12 with favorable working efficiency. Therefore, the thermal-conductive elastic member 12 is used to bond the temperature adjusting element 11 and the heat radiating plate 14.

Figure 5D:
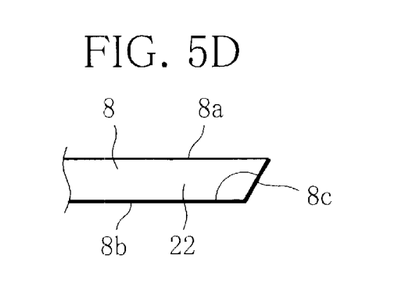
FIG. 5D is an enlarged view of the incident face of the optical multiple reflector.

Next, with reference to FIGS. 5A and 5D, description will be given of the relation as to the bonding and arrangement of the optical multiple reflector 8 and the temperature adjusting element 11, and the relation as to the fixing or the bonding and arrangement of the temperature adjusting element 11 and the heat radiating plate 14. Here, the reflecting face 8b, the transmitting face 8a, the incident face 8c, and the longitudinal left side 22 of the optical multiple reflector 8 are shown in FIG. 5D.

The wavelength division multiplexed light incident on the incident face 8c must be prevented from undergoing the effect of diffraction in the holder 17. In other words, the optical multiple reflector 8 needs to be arranged at a location such that the optical path of the wavelength division multiplexed light incident on the incident face 8c is not interrupted by the holder 17. When the holder 17 of FIG. 4A is used in the configuration of FIG. 5A, the reflecting face 8b is bonded to the peripheral wall of the opening 20 in the holder 17, or the overlapping support frame 25, with the incident face 8c positioned near the peripheral wall of the holder 17. That is, the incident face 8c becomes susceptible to diffraction due to the peripheral wall of the holder 17.

Therefore, in such cases, the holder 17 of FIG. 4A is preferably replaced with the holder 17 of FIG. 4B in which the overlapping support frame 25 is arranged partly. In the case of the holder 17 shown in FIG. 4B, either of the reflecting face 8b and the transmitting face 8a may be bonded to the overlapping support frame 25. The reason for this is that the overlapping support frame 25 will not interrupt the optical path of the wavelength division multiplexed light incident on the incident face 8c and the optical path of the wavelength division multiplexed light emitted from the transmitting face 8a.

The provision of the overlapping support frame 25 exclusively along the edge of the mounting surface 21 of the holder 17 increases an open space that is not bonded to the overlapping support frame 25 nor affected by diffraction. As a result, the optical multiple reflector 8 can be arranged with the incident face 8c on either of its longitudinal right and left sides.

The portion where the transmitting face 8a of the optical multiple reflector 8 and the surface of the temperature adjusting element 11 are opposed to each other is bonded via the thermal-conductive elastic member 12. The bonding area where the transmitting face 8a of the optical multiple reflector 8 and the surface of the temperature adjusting element 11 are opposed to each other is preferably widened to allow efficient control of the temperature of the optical multiple reflector 8. Too wide a bonding area, however, can be a detriment to the transmitted light emitted from the transmitting face 8a, causing a drop in optical intensity. Therefore, the bonding area cannot be made so wider. That is, the location to bond the temperature adjusting element 11 to this transmitting face 8a must be confined within the portion where no drop occurs in the intensity of the light emitted from the transmitting face 8a. Description of this portion is omitted here, for it has been given previously.

In the example shown in FIGS. 5A, 5B, 5C, and 5D, the bonding location of the temperature adjusting element 11 falls within the range of, for example, 5 mm or more off the end of the transmitting face 8a on the incident-face-8c side and the end opposite to the incident-face-8c side. The range from 7 mm or more off to the end opposite to the incident-face-8c side is preferable. The temperature adjusting element 11 can be bonded to this bonding location without any drop in optical intensity.

It has been confirmed by experiments that the temperature adjusting element 11, when bonded to this bonding portion, causes no hindrance to the transmitted light at a wavelength of 1.5 $\mu$m.

The temperature adjusting element 11 has one surface bonded to the transmitting face 8a via the thermal-conductive elastic member 12, and the other, opposite surface bonded to the heat radiating plate 14 by soldering or with an adhesive having thermal conductivity. When the thermal-conductive elastic member 12 is used as this adhesive, it follows that the thermal-conductive elastic member 12 bonds not only the portion where the transmitting face 8a of the optical multiple reflector 8 and one surface of the temperature adjusting element 11 are opposed to each other but also the portion where the other surface of the temperature adjusting element 11 and the heat radiating plate 14 are opposed to each other. That is, the nonuse of two types of adhesives results in excellent working efficiency, and the interposition of the double layers of absorbers between the heat radiating plate 14 and the optical multiple reflector 8 makes the optical multiple reflector 8 less prone to move.

The heat radiating plate 14 and the support base 16 are fixed with a screw. Although not shown in the diagrams, the fixing location falls, for example, to the left which is the contact area between the support base 16 and the heat radiating plate 14.

Since the thermal-conductive elastic member 12 is also interposed between the holder 17 and the heat radiating plate 14 which sandwich the optical multiple reflector 8, forces acting between the holder 17 and the heat radiating plate 14 are absorbed by the thermal-conductive elastic member 12. This makes the optical multiple reflector 8 less prone to move. In the meantime, both of the holder 17 and the heat radiating plate 14 are fixed to the support base 16, and the support base 16 has higher rigidity than that of the heat radiating plate 14. Therefore, the heat radiating plate 14 functions as a spring, preventing the thermal-conductive elastic member 12 from receiving forces. As a result, the optical multiple reflector 8 becomes less prone to move.

Next, with reference to FIG. 1, the physical relationship among the individual parts and the propagation of the wavelength division multiplexed light will be described. That is, description will be given of the arrangement of the optical incidence/output device 2 composed of the optical fiber 5 and the first lens 6, the optical multiple reflector 8, the movable optical reflection device 3 composed of the second lens 7 and the reflecting element 4 which is kept at a constant distance from the second lens 7, and the support base (not shown).

The optical incidence/output device 2 is composed of the single-mode optical fiber 5 and the first lens 6 which is composed of a collimator lens and a cylindrical lens. The wavelength division multiplexed light propagated through the optical fiber 5 is incident on the first lens 6. The optical incidence/output device 2 is arranged and fixed in a single ferrule (not shown) with the optical axes of the optical fiber 5 and the first lens 6 in agreement with each other.

This ferrule is preferably fit to a circular cylinder that has an inner diameter fitting to the outer diameter of a ferrule-side opening and a length at least capable of YAG laser welding. The ferrule and the cylinder are fitted and then fixed by YAG laser welding. This cylinder, after fixed to the ferrule, is YAG-laser-welded to the support base. In this way, the ferrule is fixed to the support base. Incidentally, for the sake of YAG-laser-welding the cylinder to the support base 16, the support base 16 may be partially modified in shape. Moreover, the length of the cylinder can be modified to adjust the distance between the first lens 6 and the optical multiple reflector 8 for a yet preferable structure.

Aside from the optical multiple reflector 8 which is mounted via the holder (not shown), a slide rail (not shown) is also fixed to the support base. The movable optical reflection device 3 composed of the second lens 7 and the reflecting element 4 is mounted on this slide rail. The second lens 7 and the reflecting element 4 of the movable optical reflection device 3 are retained by a retainer (not shown) such as keeps the two parts at a constant distance and maintains optical-axis matching all the time. The optical multiple reflector 8 and the movable optical reflection device 3 are mounted on the support base under such a structure. Therefore, the movable optical reflection device 3 can be moved over the slide rail to control the distance between the transmitting face 8a of the optical multiple reflector 8 and the second lens 7 of the movable optical reflection device 3. Incidentally, the axis of the slide rail must be adjusted so as to be parallel to the optical axis of the wavelength division multiplexed light emitted from the optical multiple reflector 8. The aim of this is to maintain the optical axes of the movable optical reflection device 3 and the optical multiple reflector 8 in agreement all the time.

Initially, each optical system is adjusted with consideration given to the optical axis of the optical multiple reflector 8 mounted on the holder, the optical axis of the first lens 6 arranged and fixed to the ferrule, and the optical axis of the second lens 7. Then, the wavelength division multiplexed light emitted from the ferrule is applied to the incident face 8c of the optical multiple reflector 8, and the individual optical systems are adjusted in position so that the propagated power has a predetermined characteristic. After the positions of the individual optical systems are determined, the holder is YAG-laser-welded to the support base, and the cylinder fitted to the ferrule having the first lens 6 fixed thereto is YAG-laser-welded to the support base.

The optical axis of the second lens 7 and the reflecting element 4 and the axis of the slide rail along which the retainer moves are brought into agreement with the direction of the light emitted from the transmitting face 8a of the optical multiple reflector 8, i.e., the center-wavelength light which satisfies the above-described equation (1). Subsequently, the slide rail is screw-fixed to the support base 16. Then, the optical axes of the optical systems of the optical incidence/output device 2 and the optical multiple reflector 8, and the optical axis of the movable optical reflection device 3 are fine adjusted to make a fine adjustment of the entire optical axes of the variable dispersion compensator.

While the holder and the support base are made of stainless steel for the sake of YAG-laser-welding, the holder of the optical multiple reflector 8 may be made of aluminum. Moreover, the optical multiple reflector 8 and the holder are also preferably bonded by an adhesive having thermal conductivity so that the holder functions as a heat radiating member. In terms of working efficiency, the thermal-conductive elastic member is preferably used as the adhesive having thermal conductivity. When the holder is made of aluminum, the holder and the support base are preferably bonded with a thermosetting adhesive such as epoxy-type adhesives.

As has been described, according to the present invention, even if the ambient use temperature of the variable dispersion compensator varies, the temperature of the optical multiple reflector is maintained constant by the temperature regulator. This reduces the changes of the refractive index and thickness resulting from temperature variations, allowing the elimination of the first instability described above.

The thermal-conductive elastic member for bonding the optical multiple reflector and the temperature regulator has elasticity. Therefore, vibrations acting on the optical multiple reflector are absorbed by the thermal-conductive elastic member that is sandwiched between the optical multiple reflector and the temperature regulator. This reduces vibrations of the incident face, the reflecting face, and the transmitting face of the optical multiple reflector, allowing the elimination of the second instability described above. Moreover, since the thermal-conductive elastic member has thermal conductivity, the temperature of the optical multiple reflector is conducted to the temperature regulator rapidly. This contributes to efficient temperature control, allowing the elimination of the first instability described above.

The temperature regulator is composed of the temperature adjusting element for controlling the temperature of the optical multiple reflector, the temperature detecting element for detecting temperature, and the controller for controlling the temperature adjusting element based on the detected temperature from the temperature detecting element. Therefore, the temperature of the optical multiple reflector can be controlled easily, allowing the elimination of the first instability described above.

The reflecting face or the transmitting face of the optical multiple reflector is bonded to at least part of the peripheral fall that lies on the periphery of the opening in the holder which has the opening in its side. Therefore, the reflecting face or the transmitting face of the optical multiple reflector can be bonded to the peripheral wall of the holder, and the incident side of the wavelength division multiplexed light can be set on either one of the sides astride the space in the holder opening that catches the optical multiple reflector. Thus, the flexibility of design of the variable dispersion compensator can be increased by double.

In this way, the force to originate vibrations between the heat radiating plate and the holder are absorbed by the thermal-conductive elastic member, reducing vibrations of the optical multiple reflector. The temperature of the optical multiple reflector is rapidly conducted to the temperature regulator by the thermal-conductive elastic member. The thermal-conductive elastic layer is bonded to the transmitting face or the reflecting face of the optical multiple reflector without loss of refractive-index isotropy in the transmitting face, the reflecting face, and the glass base of the optical multiple reflector. Thereby, it is possible to realize a variable dispersion compensator of improved optical characteristics, mechanical stability, and temperature stability.

What is claimed is:

1. A variable dispersion compensator comprising:
   an optical incidence/output device for propagating wavelength division multiplexed light, composed of an optical fiber and a lens;
   an optical multiplex reflector on which the wavelength division multiplexed light emitted from said optical incidence/output device is incident for repetitive reflections between a transmitting face and a reflecting face thereof; and
   a movable optical reflection device for reflecting the wavelength division multiplexed light emitted from said optical multiple reflector toward said optical multiple reflector, said movable optical reflection device being composed of a lens and a reflecting element and being capable of controlling the distance from said optical multiple reflector, and wherein
   a temperature adjusting element for controlling the temperature of said optical multiple reflector is arranged on a surface of said optical multiple reflector at a point where no drop occurs in the intensity of the wavelength division multiplexed light incident/emitted, and a thermal-conductive elastic member is interposed between the surface of said optical multiple reflector and said temperature adjusting element, wherein
said reflecting face or said transmitting face of said optical multiple reflector is bonded to at least part of a peripheral wall lying on the periphery of an opening in a holder, said holder having the opening in its side.

2. The variable dispersion compensator according to claim 1, wherein
said thermal-conductive elastic member is made of an adhesive having thermal conductivity and elasticity.

3. The variable dispersion compensator according to claim 1, wherein:
a temperature detecting element for detecting the temperature of said optical multiple reflector is arranged on a surface of said optical multiple reflector at a portion where no drop occurs in the intensity of the wavelength division multiplexed light incident/emitted; and
a thermal-conductive elastic member is interposed between the surface of said optical multiple reflector and said temperature detecting element.

4. The variable dispersion compensator according to claim 3, wherein
a controller for controlling said temperature adjusting element based on a detected temperature from said temperature detecting element is arranged.

* * * * *